United States Patent
Knight, Sr.

(10) Patent No.: US 9,756,985 B2
(45) Date of Patent: Sep. 12, 2017

(54) SERVING UTENSIL HOLDER

(71) Applicant: Bernard Knight, Sr., Sanford, FL (US)

(72) Inventor: Bernard Knight, Sr., Sanford, FL (US)

(*) Notice: Subject to any disclaimer, the term of this patent is extended or adjusted under 35 U.S.C. 154(b) by 130 days.

(21) Appl. No.: 14/612,272

(22) Filed: Feb. 2, 2015

(65) Prior Publication Data

US 2015/0216364 A1 Aug. 6, 2015

Related U.S. Application Data

(60) Provisional application No. 61/935,149, filed on Feb. 3, 2014.

(51) Int. Cl.
*A47J 47/16* (2006.01)

(52) U.S. Cl.
CPC .................. *A47J 47/16* (2013.01)

(58) Field of Classification Search
CPC ............ A47J 47/16; A47J 45/02; A47F 10/06
See application file for complete search history.

(56) References Cited

U.S. PATENT DOCUMENTS

| | | | | |
|---|---|---|---|---|
| 2,086,980 A * | 7/1937 | Kirby | ...................... | H04M 1/04 248/413 |
| 5,396,993 A * | 3/1995 | Spitler | ..................... | A47J 47/16 211/41.2 |
| 7,311,289 B2 * | 12/2007 | Mori | ..................... | A47B 21/045 248/165 |
| 2013/0168342 A1 * | 7/2013 | Yatscoff | .................... | A47F 5/04 211/85.2 |
| 2015/0014495 A1 * | 1/2015 | Bausman | ................ | A47J 47/16 248/176.2 |

* cited by examiner

*Primary Examiner* — Sarah McPartlin

(57) ABSTRACT

A Serving Utensil Holder made of any material approved for food service. The holder has a 90 degree flange base, round base, hook base or flat base.

The base is connected to stationary or adjustable shaft with top end fitted with a utensil holder attachment to hold various types, and sizes of food serving utensils. The 90 degree base and round base have a vertical edge and fit in the well of a buffet line server. The top of the base rest on flat area around the buffet server well.

Flat base holder is used on flat areas and can have a bowl for drippings from serving utensil. The hook base enables the utensil Holder to hook on edge of buffet server well to stabilize it without fasteners. Attachments can be permanently made on shaft, or fixed with fasteners allowing other attachments to be used on the same utensil holder.

1 Claim, 6 Drawing Sheets

SERVING UTENSIL HOLDER

RELATED APPLICATIONS

The present application is a continuation application of U.S. provisional patent application, Ser. No. 61/935,149, filed Jan. 31, 2015, for SERVING UTENSIL HOLDER, by Bernard Knight Sr., included by reference herein and for which benefit of the priority date is hereby claimed.

FIELD OF THE INVENTION

The present invention relates to cooking and food serving utensils and, more particularly, a stand that holds spoons, ladles, tongs, and various cooking and food serving utensils to keep them from contamination by being left on counters, stove tops or in serving pans with the food.

BACKGROUND OF THE INVENTION

Spoons, ladles, tongs, and other serving utensils used in the commercial food service are either left in the food pan or on buffet counters which in both cases increase the chances of the utensil being contaminated and thus contaminating the food.

Some in the food service industry have made attempts to elevate this problem by creating serving spoon rests, which are small bowls or trays that hold the serving utensil keeping them from being left in cooking containers, on stoves, on food servers, countertops or tables when the utensil is not being used. Such examples are patent application numbers U.S. Ser. No. 29/195,746, and U.S. Ser. No. 29/152,455.

Another product is a small pan that attaches to the side of a food server and hold the serving utensil. A third product is devices that clips on to the cooking pot enabling the serving utensil to be attached, and thus keeps it from resting in food, on stoves, tables, or countertops.

These products may work in home settings or on small buffet lines, but they are not practical to use on most commercial food serving lines such as those in schools, hospitals, cafeterias, restaurants, etc. Because of the variety of foods on a buffet line requiring separate serving utensils, there is not enough counter space to accommodate separate spoon rests for each type of food.

A short coming of the tray type spoon holder that clips on to the side of pots is impractical on most commercial buffet serving lines because many of them have steam wells with serving pans with no place to place a clip-on type spoon holder.

A short coming of some spoon holders that clip onto the pot itself is that they can only be used on chafer serving lines and will not fit on pans or trays used on most conventional serving lines with steam wells.

It is therefore an object of the invention to provide a holder for food serving utensils.

It is another object of the invention to keep food serving utensils from contamination from being left on countertops, tables, stoves or other surfaces.

It is another object of the invention to provide a holding place for food serving utensils when they are not being used in serving food.

SUMMARY OF INVENTION

In accordance with the present invention, there is provided a Serving Utensil Holder made of stainless steel or any material, metal, plastic, or composite that is approved to be used in the food service industry. The serving utensil holder has a 90 degree angled flanged base connected to a vertical tubular shaft having a telescoping L-shaped arm that adjust up and down. The L-shaped arm has a connection point at the end to receive removable attachments for hanging various serving utensils.

Serving utensil holder base includes a flat portion and vertical flange for hooking into a buffet well.

BRIEF DESCRIPTION OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the Figures.

DESCRIPTION OF THE PREFERRED EMBODIMENT

Figure 1:
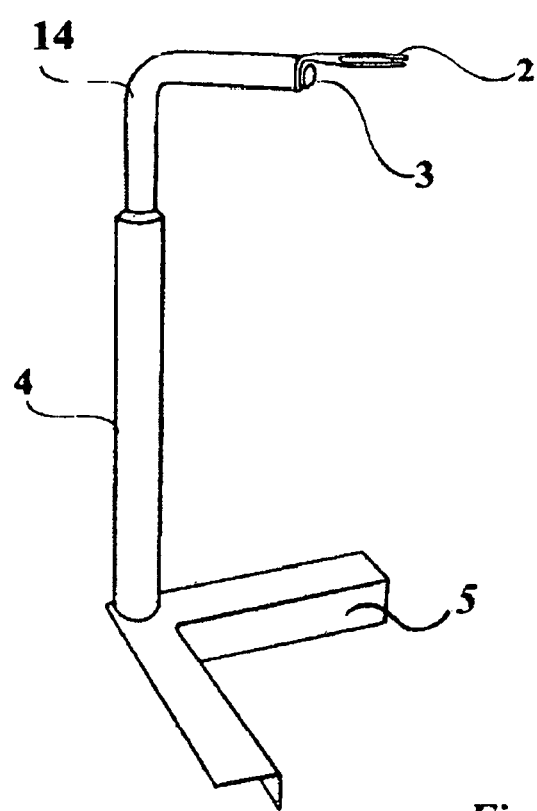
FIG. 1 is a right perspective view of a serving utensil holder with a 90 degree angled base; having a flat portion and vertical flange for hooking into a buffet well. The base is connected to a vertical tubular shaft that has a telescoping L-shaped arm. The adjustable arm has a connection point to receive a C-shaped prong attachment in accordance with the invention.

FIG. 1 is a right view of a Serving Utensil Holder 1 in accordance with, the invention, showing a 90 degree angled base 5, vertical tubular shaft 4, telescoping L-shaped arm 14, utensil holder C-shaped attachment 2, and a fastener 3.

Figure 2:
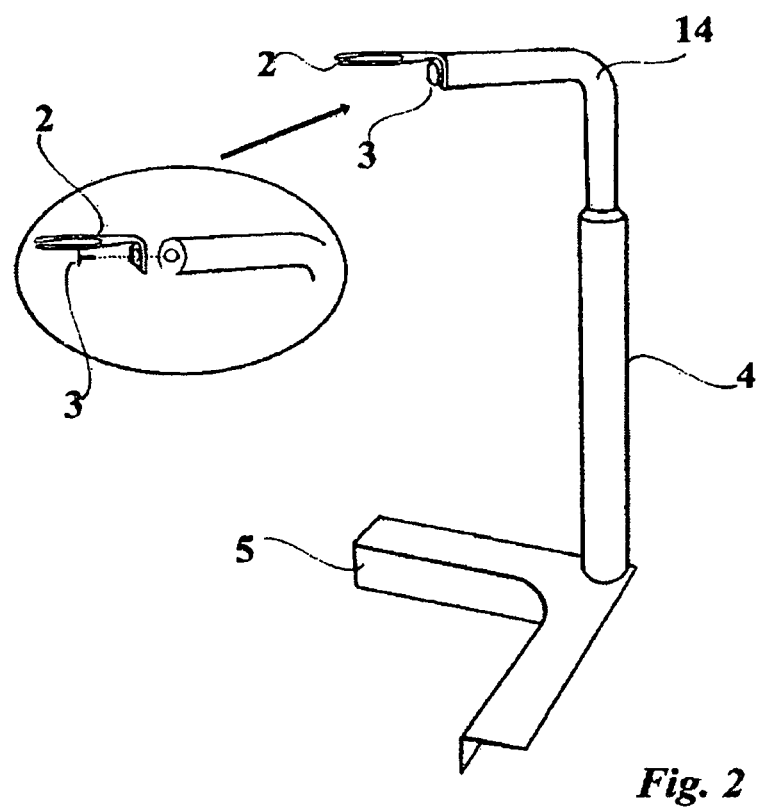
FIG. 2 is a left perspective view of a serving utensil holder with a 90 degree angled base having a flat portion and vertical flange for hooking into a buffet well. The base is connected to a vertical tubular shaft that has a telescoping L-shaped arm. The adjustable arm has a connection point to receive a C-shaped prong attachment in accordance with the invention.

FIG. 2 is a left view of a Serving Utensil Holder 1 having a 90 degree angled base 5 vertical edges that fit in a buffet well 12, 90 degree corner. The flat portion of the 90 degree angled base 5 rests on the top of the buffet well 12, 90 degree corner. The vertical tubular shaft 4 allows L-shaped arm 14 to adjust up and down. L-shaped arm 14 has a C-shaped attachment 2 at the end that is connected by a fastener 3.

Figure 3:
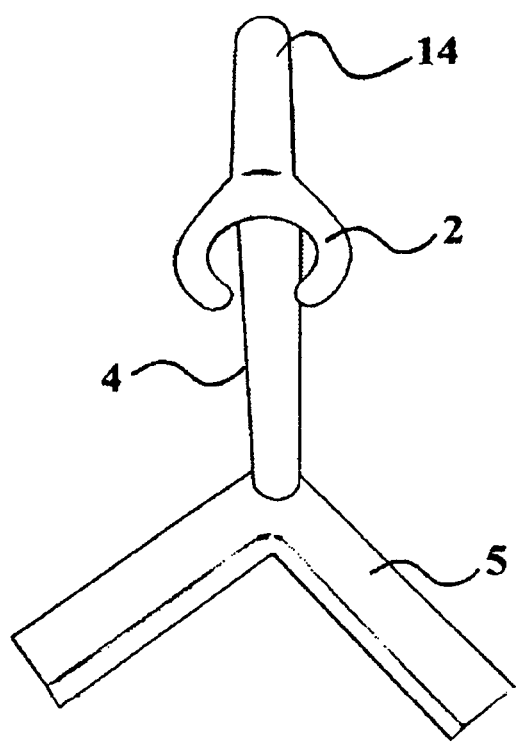
FIG. 3 is a top elevated exploded view of a serving utensil holder's C-shaped prong attachment, connected to the end of the telescoping L-shaped arm. The L-shaped arm is connected to a vertical tubular shaft and the shaft is connected to a 90 degree angled base with a flat portion and vertical flange for hooking into a buffet well in accordance with the invention.

FIG. 3 is a top view of a Serving Utensil Holder 1 showing a more detail view of the C-shaped attachment 2, the L-shaped telescoping arm, vertical tubular shaft 4 and 90 degree angled flange base 5.

Figure 4:
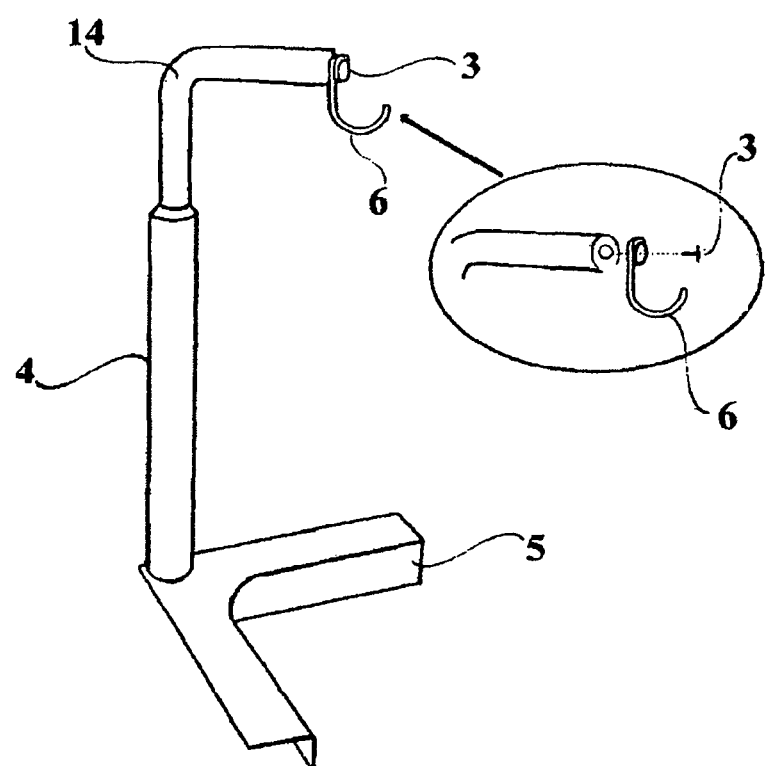
FIG. 4 is a right view of a serving utensil holder with a 90 degree angled base having a flat portion and vertical flange for hooking into a buffet well. The base is connected to a vertical tubular shaft that has a telescoping L-shaped arm. The adjustable arm has a connection point to receive a C-shape prong attachment in accordance with the invention.

FIG. 4 is a left view of a. Serving Utensil Holder having a 90 degree flange base 5, having vertical edges that fit inside the 90 degree corners of a buffet well 12. The flat portion of the 90 degree base 5 rests on the top edge of the corner. The vertical tubular shaft 4 allows L-shaped arm 14 to adjust up and down. At the end of L-shaped arm 14 is a hook-shaped attachment 6 connected by a fastener 3.

Figure 5:
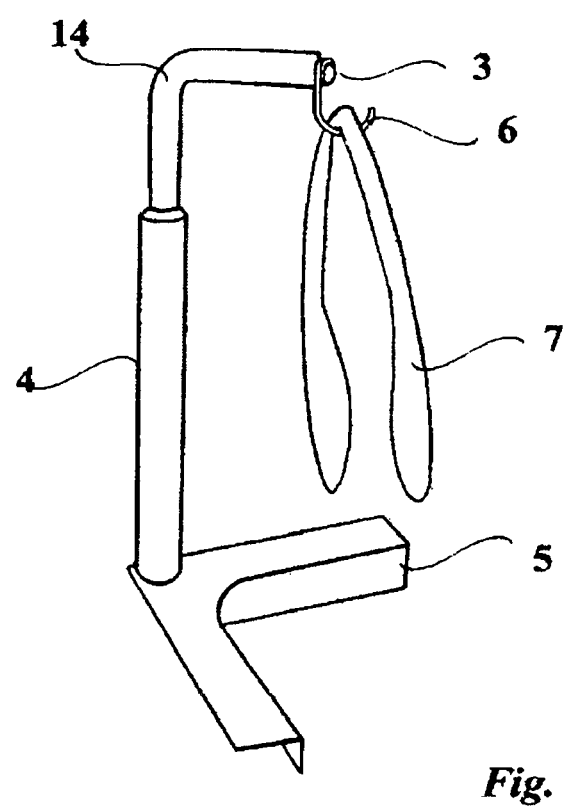
FIG. 5 is a right view of a serving utensil holder having a 90 degree angled base having a flat portion and vertical flange for hooking into a buffet well. The base is connected to a vertical tubular shaft that has a telescoping L-shaped arm. The end of the arm has a connection point to receive a hook-shaped attachment for holding hanging serving utensils in accordance with the invention.

FIG. 5 is a left view of a Serving Utensil Holder 1 having a 90 degree angled flange base 5 having vertical edges that fit inside a 90 degree corner of a buffet well 12. The horizontal edges of the flange base 5 rests on top of the corners on the buffet well 12. The vertical tubular shaft 4 allows L-shaped arm 14 to adjust up and down and rotate left or right. At the end of L-shaped arm 14 is a hook-shaped attachment 6 connected by a fastener 3. Hanging from the hook-shaped attachment 6 is a food serving utensil 7.

Figure 6:
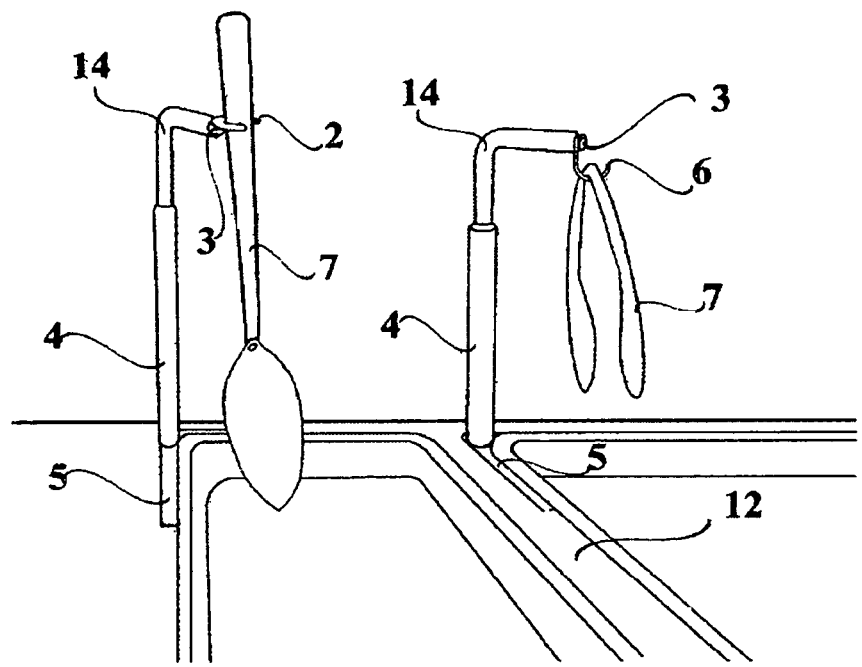
FIG. 6 is a front view of two serving utensil holders both having 90 degree angled bases and are seated under a food pan in the buffet's well 90 degree corner. Left utensil holder has a C-shaped prong attachment and right holder has a hook-shaped attachment. Both holders both having hanging serving utensils.

FIG. 6 is a front perspective view of two serving utensil holders 1 seated in buffet well 12 with C-shaped attachment 2 and hook-shaped attachment 6 and holding food serving utensil 7. The Food serving pan 8 is sitting on top of the 90 degree angled base 5 of the serving utensil holder 1.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A serving utensil holder for hanging cooking and food serving utensils comprising:
   a base for seating the serving utensil holder on a buffet, the base including a rectangular outside edge and a curved inside edge, the rectangular outside edge including a first segment and a second segment extending at 90 degrees to the first segment, the curved inside edge including a rolled flange extending downwardly therefrom and configured to extend into a well formed in the buffet to seat the base securely therein;
   a support including a hollow shaft extending upwardly from a top surface of the base and an L-shaped arm received therein, wherein the L-shaped arm is telescopically adjustable with respect to the hollow shaft to accommodate varying heights of serving utensils hanging therefrom; and a hanging attachment detachably connected to an outside end of the L-shaped arm, wherein the hanging attachment is c-shaped or hooked shaped and is adapted to hang the cooking and food serving utensils therefrom, keeping the cooking and food serving utensils from touching and contaminating surrounding surfaces.

* * * * *